United States Patent
Straubel et al.

(10) Patent No.: US 11,731,791 B2
(45) Date of Patent: Aug. 22, 2023

(54) BRAKE DEVICE AND METHOD AND DEVICE FOR UNFOLDING A ROLLER-UP ELONGATE HOLLOW MEMBER

(71) Applicant: DEUTSCHES ZENTRUM FÜR LUFT- UND RAUMFAHRT E.V., Cologne (DE)

(72) Inventors: Marco Straubel, Magdeburg (DE); Martin Hillebrandt, Braunschweig (DE)

(73) Assignee: DEUTSCHES ZENTRUM FUR LUFT- UND RAUMFAHRT E.V., Cologne (DE)

(\*) Notice: Subject to any disclaimer, the term of this patent is extended or adjusted under 35 U.S.C. 154(b) by 593 days.

(21) Appl. No.: 16/840,869

(22) Filed: Apr. 6, 2020

(65) Prior Publication Data
US 2020/0324922 A1 Oct. 15, 2020

(30) Foreign Application Priority Data
Apr. 12, 2019 (DE) .................... 10 2019 109 809.2

(51) Int. Cl.
*B65H 75/30* (2006.01)
*B64G 1/22* (2006.01)
*B65H 16/06* (2006.01)

(52) U.S. Cl.
CPC ............ *B64G 1/222* (2013.01); *B65H 16/06* (2013.01); *B65H 75/30* (2013.01); *B65H 2403/725* (2013.01); *B65H 2701/1123* (2013.01)

(58) Field of Classification Search
CPC .. B65H 16/06; B65H 75/30; B65H 2403/725; B65H 2701/1123; B64G 1/222
See application file for complete search history.

(56) References Cited

U.S. PATENT DOCUMENTS

| 6,345,781 B1 * | 2/2002 | Bowers ............... B65H 49/30 242/574.4 |
| 2013/0220760 A1 | 8/2013 | Tsao |

(Continued)

FOREIGN PATENT DOCUMENTS

| DE | 49895 C | 5/1889 |
| DE | 10 2016 101 430 B4 | 11/2017 |

(Continued)

OTHER PUBLICATIONS

Meyer, S. et al., "Design of the De-Orbit Sail Boom Deployment Unit", 13th European Conference on Spacecraft Structures, Materials, & Environmental Testing, 2014.

*Primary Examiner* — Sang K Kim
(74) *Attorney, Agent, or Firm* — WCF IP (57) ABSTRACT

The invention relates to a brake device for producing a brake torque counter to a torque acting on a rotatably supported member, wherein the brake device has:
- at least one toothed brake ring which is mechanically actively connected to the rotatably supported or supportable member,
- a plurality of bending-resistant brake levers which each have at a first lever end at least one stop which engages in the tooth arrangement of the brake ring and which are each rotatably supported on a second lever end opposite the first lever end,
- wherein each brake lever is connected to a force element for applying a brake force in such a manner that, as a result of the brake force via the stop of the respective brake lever which is in engagement with the tooth arrangement of the brake ring, a brake torque is produced on the brake ring tangentially counter to the active direction of the torque in order to apply a brake torque to the rotatably supported or supportable member, (Continued)

wherein the brake levers are arranged with respect to the toothed brake ring in such a manner that, during a rollover of a brake lever, in which the stop of the respective brake lever engages in a subsequent tooth flank of the tooth arrangement, all remaining brake levers with their respective stops remain in engagement with their respective tooth flank of the tooth arrangement.

14 Claims, 5 Drawing Sheets

(56) References Cited

U.S. PATENT DOCUMENTS

| | | |
|---|---|---|
| 2016/0031155 A1 | 2/2016 | Tyler |
| 2016/0311558 A1* | 10/2016 | Turse .................... B64G 1/222 |
| 2019/0382231 A1* | 12/2019 | Hillebrandt ........ B65H 75/4471 |

FOREIGN PATENT DOCUMENTS

| | | |
|---|---|---|
| DE | 102016101430 B4 | 11/2017 |
| DE | 10 2018 105 765 A1 | 9/2019 |
| DE | 10 2018 112 690 A1 | 11/2019 |
| DE | 10 2018 112 691 A1 | 11/2019 |
| DE | 102019109809 A1 | 10/2020 |
| FR | 1083020 A | 9/1953 |
| FR | 3095022 A1 | 10/2020 |

* cited by examiner

Figure 1

Isometric view, scale: 1:1

BRAKE DEVICE AND METHOD AND DEVICE FOR UNFOLDING A ROLLER-UP ELONGATE HOLLOW MEMBER

The invention relates to a brake device for producing a brake torque counter to a torque acting on a rotatably supported member. The invention also relates to a device for unfolding a rolled-up elongate hollow member having such a brake device and a method for unfolding at least one rolled-up elongate hollow member for this.

Since the beginning of space travel, masts have been used as carriers for sensors and instruments, as a supporting structure for solar arrays, antennae and solar sails and for other applications. Since, however, even today the transport of goods, such as, for example, satellites, are subject to a strict weight and space restriction, masts which protrude from the transported goods represent a not inconsiderable problem.

Therefore, unfoldable masts are very often used and are initially prepared in a rolled-up and compressed state for transport and then at the destination are unrolled and unfolded, whereby they obtain their corresponding stability and can support the corresponding instruments, sensors, solar sails or solar panels.

Such an unfoldable mast is in this instance generally an elongate hollow member whose cross-section is configured in such a manner that the elongate hollow member can be shaped to form a flat strip. Depending on the construction, this flat strip has the tendency to unfold and can consequently form the corresponding hollow space inside the elongate hollow member.

In the context of the present invention, an elongate hollow member is consequently intended to be understood to be a component which may be present both in the unfolded and in the rolled-up state and which in the rolled-up state has no hollow space. The term "elongate hollow member" defines in this instance in the broadest sense the ability to form such a hollow space within the elongate hollow member, that is to say, when the elongate hollow member is unrolled and unfolded.

Such an elongate hollow member which is intended to be used as an unfoldable mast, in particular in space travel, is in this instance generally rolled up on a winding core, whereby it is necessarily present as a flat strip accordingly rolled up on the winding core and compressed. If the winding core is now rotated about the axis thereof, the rolled-up elongate hollow member is moved from the rolled-up and compressed first state thereof into an unrolled and unfolded second state, wherein during the unrolling from the winding core the elongate hollow member assumes the original cross-sectional shape thereof again or a transitional cross-sectional shape and unfolds and consequently correctly forms the hollow space within the elongate hollow member.

Such unfoldable masts are in this instance produced in most cases from thin-walled shells comprising metal or fiber-composite materials, wherein the individual shells as a result of their small wall thickness resiliently deform to form a flat strip and can thereby be rolled up on the winding core in a space-saving manner. There is thus known, for example, from the subsequently published DE 10 2018 105 765 A1 a shell mast which can be rolled up and which is produced completely from a fiber-composite material, having a fiber material and a matrix material in which the fiber material is embedded. In this instance, the shell mast which can be rolled up is formed from at least two fiber-composite half-shells which are accordingly connected to each other in a joining edge region in a positive-locking, non-positive-locking and/or materially engaging manner. As a result of this principle of half-shell production, such elongate hollow members can be compressed and rolled up on a winding core to form a flat strip. In the compressed and rolled-up state, the joining edge regions of the two fiber-composite half-shells form the elongate edge region of the compressed hollow member, which is wound up as a flat strip.

A structurally critical feature with such elongate hollow members which are intended to be used as unfoldable shell masts is inter alia the transition region between the still rolled-up, pressed-flat portion of the hollow member and the already completely unfolded portion. In this transition region, the cross-section of the elongate hollow member is not yet completely developed, whereby both the rigidity and the stability are significantly reduced. In practice, the transition region is therefore stabilized externally with additional supporting elements, such as external shaped shells or external guide rollers, in order to thus be able to accordingly absorb the generally higher loads during unfolding in the transition region.

There is known from the subsequently published DE 10 2018 112 690.5 an unfolding mechanism for rolled-up elongate hollow members in which there is provided in the transition region an internal supporting element which engages in a positive-locking manner in an external fixing element, wherein the elongate hollow member can be guided through between the internal supporting element and the external fixing element and the fixing element, as a result of the positive-locking engagement, fixes the internal supporting element axially in its position. It is thereby possible to also support shell masts which can be rolled up with a closed cross-section in the transition region.

There is also known from the subsequently published DE 10 2018 112 691.3 an unfolding mechanism for elongate hollow members in which the transition region between the fully unfolded elongate hollow member and the securing of the elongate hollow member is supported on the winding core by means of a locking device which after completely unrolling the elongate hollow member engages in a positive-locking manner in a recess in the covering face of the winding core and thus, on the one hand, fixes the winding core in a rotationally secure manner and, on the other hand, supports it in the transition region.

Such unfolding mechanisms for elongate hollow members known from the prior art have in this instance the disadvantage that both the pressing-flat and the rolling-up have to be carried out counter to the resistance of the bending mast material so that such a rolled-up hollow member always seeks both to unroll and to unfold its tubular cross-section.

Accordingly, when, for example, it is rolled up on a cylinder, it must be pressed by an external force onto this cylinder in order to prevent its self-unfolding impulse. The cylinder must further be locked following the unrolling operation because otherwise there is no adequate connection of the unrolled elongate hollow member to the supporting structure and the overall structure becomes unstable.

DE 10 2016 101 430 B4 discloses a space vehicle membrane unfolding system and method for operating it in which using a leaf spring which engages in a toothed ring of a mast coil, a brake torque is intended to be supplied to the coil. If a torque is now applied to the coil or the winding core, the leaf spring bends and consequently produces the desired brake torque. If the end of the respective tooth flank of the outer tooth arrangement is reached, the leaf spring jumps abruptly into the following tooth arrangement and in this instance strikes the following tooth flank. It is disadvantageous in this instance that, as a result of the continuous bending and jumping over of the leaf spring onto the next tooth, the brake torque produced is not constantly applied, but instead has a saw tooth path. However, this leads to heavy loading of all components used and can lead to damage to the fragile mast structures. This is because, when the spring jumps and during the resulting impact of the spring arm on the next tooth, the force which is applied by the leaf spring temporarily completely breaks down in order to then apply a significant impact to the coil which is intended to be braked when the leaf spring strikes the following tooth. Furthermore, as a result of the orientation of the leaf spring with respect to the toothed ring, the coil which is intended to be braked can rotate only in an unwinding direction, whereby such a system can be used only after the shell mast which can be rolled up has been rolled up. However, it must be ensured in this instance that the winding core is locked until the leaf spring is used since otherwise the mast, as a result of its tendency to unfold itself, seeks to unroll itself. This makes installation and storage of the entire construction considerably more difficult.

The friction brake systems known from the prior art, such as, for example, a drum brake, are unsuitable for the implementation of such space travel structures since the application of a predetermined torque at the application location—in the anticipated temperature range between −100° C. and +150° C. as a result of the temperature-dependent friction coefficients—can no longer be ensured in an operationally reliable manner.

An object of the present invention is accordingly to provide an improved brake device, device and method for unfolding rolled-up hollow members by means of which a brake torque can be produced in an operationally reliable manner counter to a torque of a rotatably supported member without fragile structures being compromised in this instance.

The object is achieved according to the invention with the brake device according to claim 1, the device according to claim 8 and the method according to claim 11.

According to claim 1, a brake device for producing a brake torque counter to a torque acting on a rotatably supported member is claimed, wherein the brake device has at least one toothed brake ring which is mechanically actively connected to the rotatably supported or supportable member. Such a rotatably supported or supportable member may, for example, be a cylinder with a hollow space on which an elongate hollow member which can be rolled up can be wound. Consequently, the outer covering face of the rotatably supported member is particularly suitable and constructed for receiving in particular flexible members which can be wound up.

The brake device further has a plurality of bending-resistant brake levers which each have at a first lever end at least one stop which engages in the tooth arrangement of the toothed brake ring and which are each rotatably supported on a second lever end opposite the first lever end. If the rotatably supported or supportable member is rotated about its own rotation axis, the toothed brake ring which is mechanically actively connected to the rotatable member is also caused to carry out a rotational movement. As a result of the fact that the individual brake levers engage with their respective stops in the tooth arrangement of the toothed brake ring and are rotatably supported at the second lever end thereof, the bending-resistant brake levers are deflected in the event of a rotational movement of the member and consequently on a rotational movement of the toothed brake ring in the direction of the rotational movement. Since the rotation axles of the bending-resistant brake levers do not correspond to the rotation axis of the rotatably supported member and the center point of the toothed brake ring, the stops of the brake levers in the event of a rotational movement of the toothed brake ring slide over the toothed flank of the engaged tooth of the toothed brake ring until the respective brake lever springs or jumps over onto the next tooth of the tooth arrangement.

To this end, there is provision for each brake lever to be connected to a force element, for example, a resilient force element, for applying a brake force in such a manner that, as a result of the brake force via the stop of the respective brake lever which is in engagement with the tooth arrangement of the brake ring, a brake torque is produced on the brake ring tangentially counter to the active direction of the torque in order to be able to apply a brake torque to the rotatably supported or supportable member. Using the force element, it is possible for both a brake force to be applied via the toothed brake ring to the rotatably supported member, and for the brake levers after sliding from the tooth flank which is in engagement to jump over or to be returned to the following tooth of the tooth arrangement. The brake torque acting on the member is consequently produced by means of a force element which acts counter to the deflection of the brake levers about the rotation axis thereof in the event of a rotational movement of the toothed brake ring so that the brake torque is not produced by means of a bending of spring leaves, but instead exclusively by the active combination of bending-resistant rotatably supported brake levers and a respective force element, which applies a corresponding restoring force or brake force to the brake levers.

In this instance, a brake torque is also applied to the member when the torque acting on the member is smaller than the brake torque, whereby the member does not carry out a rotational movement. In this instance, the return of the brake levers as a result of the force element can be limited by means of an end stop which, for example, can be carried out by means of a corresponding geometry of the first lever end in such a manner that each brake lever is wedged with a leading tooth flank. However, it is also conceivable that corresponding pins limit a movement of the brake lever counter to the active direction of the torque.

Furthermore, there is provision according to the invention for the brake levers to be arranged with respect to the toothed brake ring in such a manner that, during a rollover of a brake lever, in which the stop of the respective brake lever engages in a subsequent tooth flank of the tooth arrangement, all remaining brake levers with their respective stops remain in engagement with the respective tooth flank thereof of the tooth arrangement. This means that, at a specific time or period of time, only one brake lever always rolls over onto the next sequential tooth flank, whilst the remaining brake levers continue to remain in engagement with their respective tooth flank.

With the present brake device according to the invention, it is possible to apply a brake torque to a rotatably supported member counter to an active torque without corresponding friction forces significantly effecting the production of the brake torque. Instead, using the present invention, the brake torque is substantially produced by a corresponding force element, which applies a brake force to accordingly bending-resistant brake levers. Consequently, the brake torque can be ensured in an operationally reliable manner in any situation, even when the brake device is used in space travel structures.

Furthermore, the brake device according to the invention enables the saw tooth nature of the brake torque curve to be significantly damped since now a plurality of brake levers roll over one after the other but never at the same time onto their next tooth flank. As a result of the fact that, in the event of a rollover onto the next tooth flank, the remaining brake levers further apply a brake force as a result of their respective force element onto the toothed brake ring, the impact or shock which is produced by the rollover and which is exerted to the toothed brake ring as a result of the rollover is significantly reduced, whereby the loading on the structures which are connected to the brake device, such as, for example, unfoldable support structures of space travel technology, can be significantly reduced, which increases the service-life of such structures and significantly decreases the risk of damage, in particular with single use without the possibility of repair.

In this instance, the brake torque is produced by means of the brake levers and force elements, whose characteristic line does not vary significantly in the provided temperature window. The brake device is therefore particularly suitable for space travel missions.

According to an embodiment, there is provision for there to be provided for each brake lever a rotary spring as a force element which engages on the respective brake lever in order to apply the brake force. Alternatively, it is also conceivable for all brake levers to be connected to each other by one and the same force element, wherein this one force element may also be constructed in the manner of a rotary spring, which then engages on the brake levers in order to accordingly apply the brake force.

According to another embodiment, there is provision for the toothed brake ring to have an inner tooth arrangement and to be arranged on an inner wall of the hollow space of the rotatably supported member, wherein the brake levers are rotatably supported in such a manner that they are in engagement via their stops with the inner tooth arrangement of the brake ring. In this instance, there may be provision for the brake levers to be rotatably or pivotably supported in the plane of the toothed brake ring so that the rotation locations of the individual brake locations are located within the toothed brake ring. It is thereby possible for the structural space which is provided to be used in the best possible manner, wherein such a brake device then requires no further external elements for applying the brake torque.

In another embodiment, there is provision for the brake device to have a restoring device which has a carrier ring which is rotatably supported and which optionally can be brought into positive-locking engagement with the brake levers by means of locking projections, wherein the restoring device is constructed in such a manner that, in the event of a rotation of the carrier ring counter to the active direction of the brake force, the brake levers are released by means of the locking projections from the tooth arrangement of the brake ring. It is thereby possible for all brake levers to be folded back at the same time to such an extent that the engagement in the brake ring is no longer produced. The member can thereby be freely rotated in both directions, which in particular promotes the storage of corresponding elements which can be rolled on the member. A disassembly of the brake elements, as is the case in the prior art, in order to roll up the corresponding members on the covering face of the rotatably supported member is consequently no longer necessary.

In another advantageous embodiment, there is provision for the tooth arrangement of the brake ring to have an asymmetrical tooth geometry. This means that the tooth flank which the brake lever strikes, in order to transfer its brake torque to the toothed brake ring, generally has a steeper inclination than the trailing tooth flank which is located behind it.

According to another embodiment, there is provision for the brake device to have at least one end position switch which cooperates with at least one brake lever in such a manner that the end position switch is activated by means of one of the brake levers when the member is rotated. When rotating the member, the brake levers are each turned back or adjusted as a result of the toothed engagement with the brake ring until they jump or roll over onto the following tooth flank. This movement play of the brake levers can now be used to activate an end position switch so that with one, a plurality or all of the brake levers, a corresponding movement, for example, rolling over onto the next tooth flank, becomes detectable. It is thereby possible using a control unit to implement a rotary encoder in accordance with the principle of the quadrature encoder, whereby the position of the rotatably supported member can be established.

In another embodiment, there is provision for the at least one brake ring to have more than one toothed profile, wherein for each toothed profile on the brake lever there is provided a stop which engages in the respective toothed profile of the brake ring.

It is thus possible, for example, for two toothed profiles to be provided, of which the first toothed profile represents the sliding geometry for the brake levers and the second toothed profile provides an impact location for the levers to jump over onto the next tooth. The sliding faces of the brake levers are thereby protected and become worn less quickly.

With the present invention, it is consequently possible to provide a brake device for rotatably supported members, in which the brake torque never briefly falls to zero. Instead, it has become possible for the brake torque path always to be above at least 50%, preferably at least 70% of the maximum load. In this instance, for the brake device, four brake arms or more can be used, wherein the toothed brake ring may have more than 17, for example, 29 teeth. In the event of an increase of the brake arm number, as long as structural space allows, the torque characteristic line can be further straightened and consequently a further increase of quality can be achieved.

The object is further also achieved according to the invention with the device according to claim 8 for unfolding a rolled-up elongate hollow member, wherein the device has at least one elongate hollow member which has two elongate shell member halves. Furthermore, the device has an unfolding mechanism which has a fixed base structure and a winding core which is rotatably supported on the base structure and on which the at least one elongate hollow member is rolled up and compressed in a first state and which, by rotating, moves and unfolds the elongate hollow member from the first state into an unrolled and unfolded second state so that an elongate hollow space is formed between the two shell member halves of the at least one elongate hollow member. The at least one elongate hollow member is in this instance secured by means of a hollow member root as a first end to the rotatably supported winding core. According to the invention, such a generically known device has a brake device as described above, which accordingly mechanically cooperates with the winding core of the device.

A shell member half may in this instance be composed of more than one shell element so that the elongate shell member half does not necessarily have to be an integral component. The shell member halves may in this instance be formed from a fiber-composite material, having a fiber material and a matrix material in which the fiber material is embedded, wherein it is then preferable for the shell member halves to each be constructed integrally and in one piece. The shell member halves of the elongate hollow member are combined to form the elongate hollow member in such a manner that they can each be compressed to form a flat strip, wherein the joint region of the two shell member halves, as long as they are not constructed integrally on the whole, should be located in the edge region of the compressed flat strip.

Consequently, the elongate hollow member is a component which has two shell member halves which are constructed in such a manner that the elongate hollow member can be compressed and rolled up to form a flat strip. This can be achieved by both shell member halves being produced separately and then joined in the respective edge regions. However, it is also conceivable for such an elongate hollow member to be constructed in an integral manner, that is to say, in one piece, wherein in the edge regions a type of flexure bearing is then provided in order to thus be able to compress the elongate hollow member in order to form a flat strip. In the mentioned joint region or articulation region, the material direction or the material path is redirected through 180 degrees. In the compressed and rolled-up state, the shell member halves rest one on the other and thus eliminate the hollow space formed by the elongate hollow member in the unrolled state.

At the respective destination, by rotating the winding core of the unfolding mechanism the elongate hollow member is then moved from the first state into an unrolled and unfolded second state so that an elongate hollow space is formed between the two shell member halves of the at least one elongate hollow member. By unrolling the rolled-up elongate hollow member, the cross-section of the elongate hollow member expands by the two shell member halves pressing away from each other so that the elongate hollow member reaches its original cross-section.

The toothed brake ring is in this instance mechanically actively connected to the winding core so that, using the brake levers of the brake device, a corresponding brake torque can be applied to the winding core. As a result of the tendency of the rolled-up elongate hollow member to unfold itself, in the stored state, that is to say, in the first state of the elongate hollow member, there permanently acts on the winding core a torque which is applied by the tendency of the rolled-up elongate hollow member to unfold itself. Using the brake device, this in principle undesirable torque can be counteracted with a brake torque which in principle is intended to be greater than the torque applied by the tendency to unfold itself. If the winding member is now rotated in order to move the elongate hollow member from the first state into the second state, the rotation of the winding core takes place counter to the brake torque which is permanently and constantly applied, wherein, when the elongate hollow member is moved from the first state into the second state, the torque which is now applied has to be greater than the brake torque provided by the brake device.

It is thereby possible, in the stored state, that is to say, in the first state of the elongate hollow member, to retain the elongate hollow member securely in the first state thereof without there being any risk of the elongate hollow member unwinding by itself inside the device or the unfolding mechanism as a result of its tendency to unfold itself. Furthermore, using the brake device at the destination, the elongate hollow member can be moved into the second state in a controlled manner since this can now be unwound from the winding core in an operationally reliable manner.

According to an embodiment, one, two, three or four elongate hollow members may be secured to the winding core.

According to another embodiment, there is provision for the unfolding mechanism to have an unrolling drive in order to rotatably drive the winding core and to move the elongate hollow member from the first state into the second state, wherein the brake torque which can be applied by the brake device to the winding core is adjusted in such a manner that the applicable brake torque of the brake device is greater than the torque produced by a self-unfolding force of the at least one elongate hollow member.

The object is further also achieved according to the invention with the method for unfolding at least one rolled-up elongate hollow member by means of an unfolding mechanism according to claim 11, wherein the at least one elongate hollow member in a first state is rolled up and compressed on a rotatably supported winding core of the unfolding mechanism and, by rotating the winding core, is intended to be moved from the first state into an unrolled and unfolded second state. The method comprises in this instance the following steps:

rotating the winding core of the unfolding mechanism in order to move the at least one rolled-up elongate hollow member from the first state into the second state, wherein, during the rotation of the winding core, a plurality of bending-resistant brake levers, which each have on a first lever end at least one stop and which are rotatably supported on a second lever end opposite the first lever end, engage with their respective stops in at least one toothed brake ring which is mechanically actively connected to the winding core, wherein, during the rotation of the winding core, a brake force is applied to each brake lever by means of a force element in such a manner that, as a result of the brake force via the stop of the respective brake lever which is in engagement with the tooth arrangement of the brake ring, a brake torque is produced on the brake ring tangentially counter to the active direction of the torque in order to apply a brake torque to the rotatably supported or supportable member, during a rollover of a brake lever, in which the stop of the respective brake lever engages in a following tooth flank of the tooth arrangement, all remaining brake levers remain in engagement with their respective stops with their respective tooth flank of the tooth arrangement.

Advantageous embodiments of the method appear in the corresponding dependent claims.

The invention is explained in greater detail by way of example with reference to the appended Figures, in which.

Figure 1:
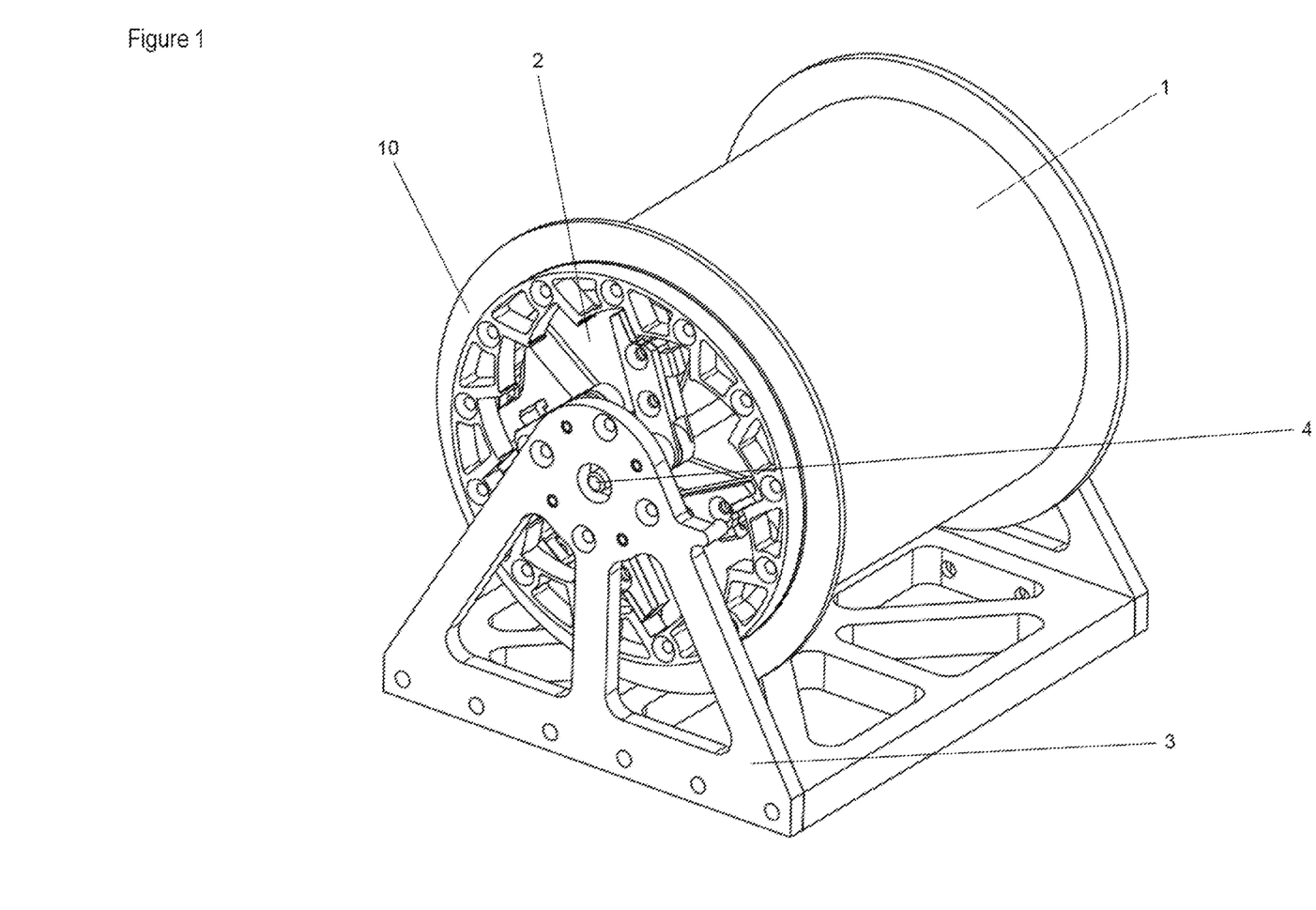
FIG. 1 is a simplified perspective illustration of a brake device according to the invention.

FIG. 1 is a conceptual illustration of the brake device 10 which is arranged in a hollow space 2 formed by a cylindrical rotatable member 1. The rotatable member 1 is in this instance supported so as to freely rotate on a base structure 3 by means of a rotation axle 4, wherein the base structure 3 is illustrated in this instance only conceptually. The base structure 3 on which the rotatable member 1 is accordingly intended to be rotatably supported, is intended to be replaced accordingly depending on the application.

Figure 2:
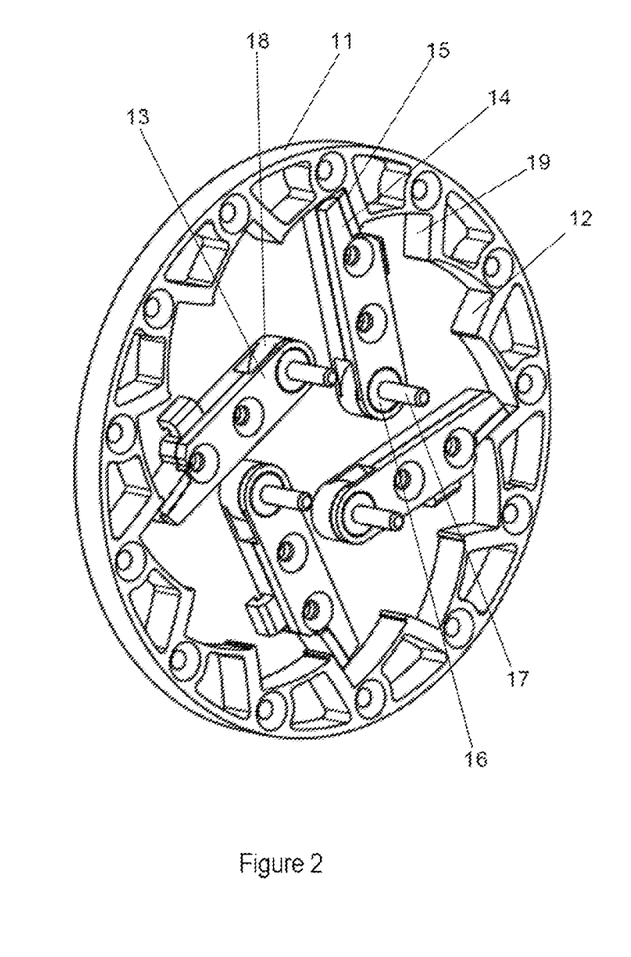
FIG. 2 is an individual depiction of the elements of the brake device.

FIG. 2 is a detailed view of the individual components of the brake device 10. These individual components 10 can also be seen in FIG. 1 in the hollow space 2 of the rotatable member 1.

The brake device 10 has in the embodiment of FIG. 2 a toothed brake ring 11 which has only a toothed profile 12. Furthermore, the brake device has a plurality of bending-resistant brake levers 13 which at a first end 14 have a stop 15 and at a second end 16 opposite the first end are rotatably supported on a rotation axle 17.

On the second end 16 there is a rotary spring 18 which applies a brake force to the respective brake lever 13. The resilient force (brake force) applied by the rotary spring 18 to the respective brake lever 13 acts in this instance in the embodiment of FIG. 2 on the respective brake lever 13 in such a manner that it seeks to rotate in a clockwise direction about the respective rotation axle 17 thereof.

Each of the brake levers 13 is in engagement with the respective stop 15 thereof with the tooth arrangement of the brake ring 11 in such a manner that the stop 15 is in engagement in a positive-locking manner in a tooth flank 19 of the brake ring 11.

As a result of the resilient force of the rotary spring 18 and the positive-locking engagement of the stops 15 with the respective tooth flank 19 of the toothed brake ring 11, a brake torque is consequently transmitted to the brake ring 11 and is directed tangentially counter to the active direction of the torque. This is because the torque which acts on the brake ring 11 and which is formed by a torque acting on the rotatable member 1 has in the embodiment of FIG. 2 an active direction counter to the clockwise direction.

The rotation axles 18 of the individual brake levers 13 are in this instance arranged with respect to the brake ring 11 inside the brake ring 11 in such a manner that, during a rollover of a brake lever 13 in which the respective stop 15 engages in a subsequent tooth flank 19, all remaining brake levers 13 remain in engagement with their respective tooth flank of the tooth arrangement with their respective stops 15. That is to say, at a specific time, only ever one brake lever can roll over or jump over onto the next tooth flank 19.

This can be achieved, for example, by all rotation axles 17 of the brake levers 13 not being located on a common circular path, whose center point is the center point of the rotation axle 4 of the rotatable member 1.

As can be seen in FIG. 2, the toothed profile 12 has an asymmetrical tooth geometry.

Figure 3:
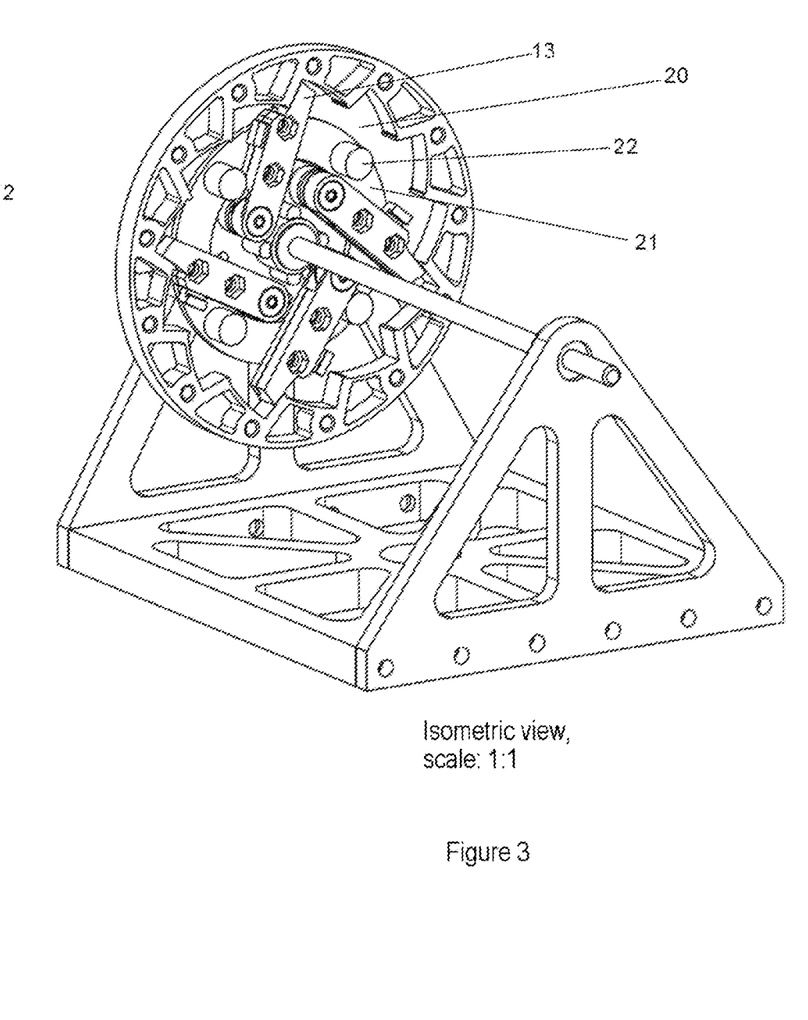
FIG. 3 is a detailed view of the restoring device.

FIG. 3 shows a restoring device 20 which has a carrier ring 21 which is rotatably arranged on the rotation axle 4 of the rotatable member 1. The carrier ring 4 has a specific number of locking projections 22, at least as many as the brake levers 13 which are provided. If the carrier ring 21 is now rotated counter to the active direction of the brake torque, the locking projections 22 of the carrier ring 21 engage in a positive-locking manner on the brake levers 13 and release the positive-locking engagement of the stops 15 in the brake ring 11 by the brake levers being returned counter to the resilient force. It is thereby possible to release the rotatable member 1 from a corresponding brake torque so that it can now be freely rotated about the rotation axle 4 thereof, whereby, for example, a corresponding installation of a mast which can be rolled up is possible. If the carrier ring is now rotated back into the original position thereof again, all the brake levers 13 again move as a result of their resilient force into their corresponding stop position, in which the corresponding brake torque is applied to the rotatable member 1.

Figure 4:
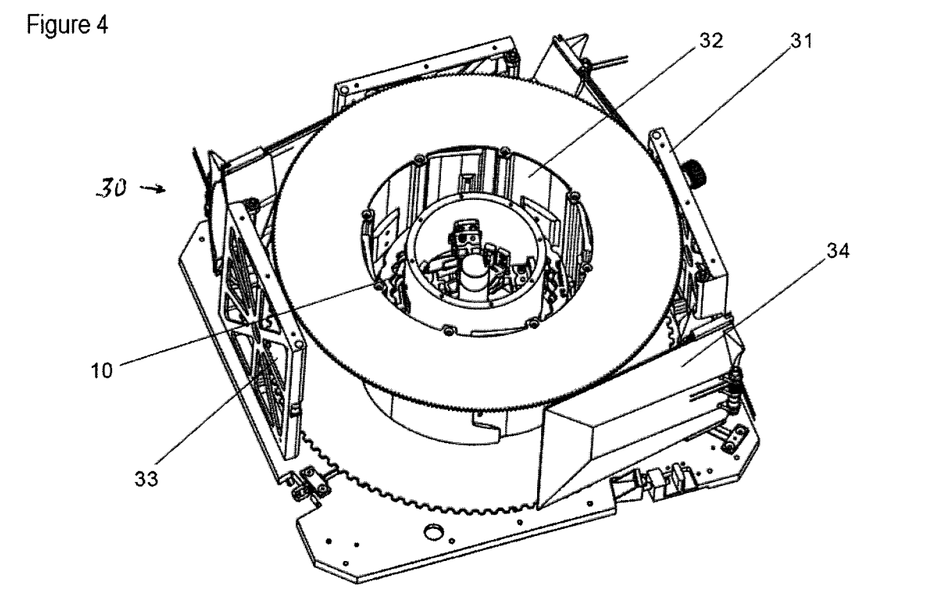
FIG. 4 is an illustration of the unfolding mechanism.

FIG. 4 shows an application example of a device 30, which has an unfolding mechanism 31 by means of which a total of four elongate hollow members 33 which are rolled up on a winding core 32 can be unrolled and unfolded in order to thus be able to form, for example, elongate mast structures. The elongate hollow members 33 are in this case wound up and compressed on the winding core 32 in a first state and by rotating the winding core 32 are moved into a second unrolled and unfolded state. In the first state, the elongate hollow members 33 are compressed flat and in this instance are wound up or rolled up in the manner of a strip on the winding core 32. By moving the elongate hollow members 33 into the second state, the cross-section of the respective elongate hollow members 33 unfolds, whereby the corresponding hollow space is formed inside the hollow members 33. Only then do the elongate hollow members 33 achieve their corresponding dimensional stability.

The device 30 has a total of four supporting elements 34 which are intended to be used to support the transition region when the elongate hollow members 33 are moved into the second state.

The winding core 32 is configured as a hollow cylinder, wherein the brake device 10 according to the invention is arranged inside the winding core 32.

Figure 5:
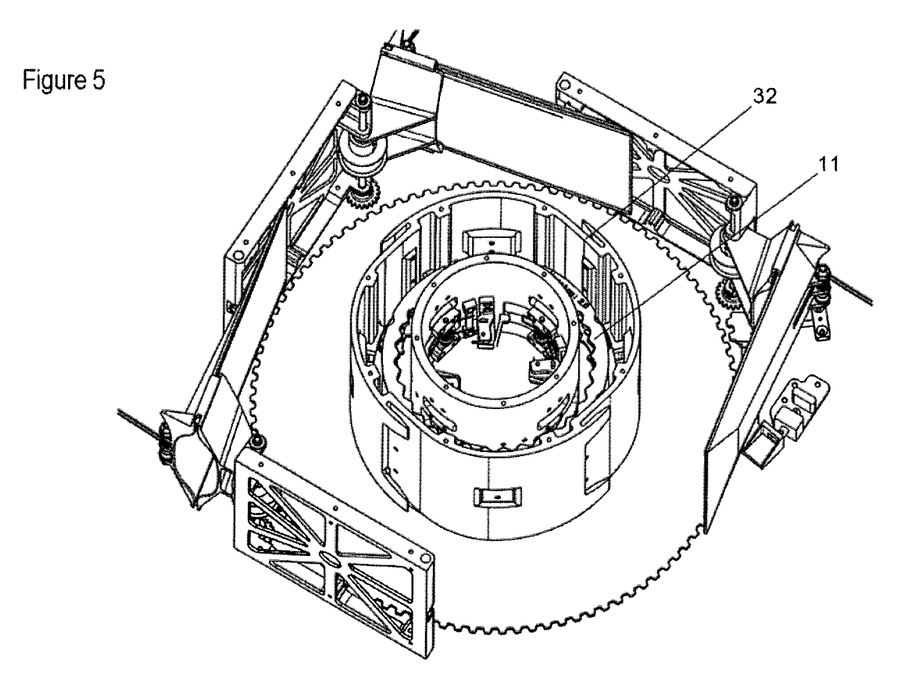
FIG. 5 is a free section of the unfolding mechanism for hollow members which can be rolled up with an integrated brake device.
Figure 6:
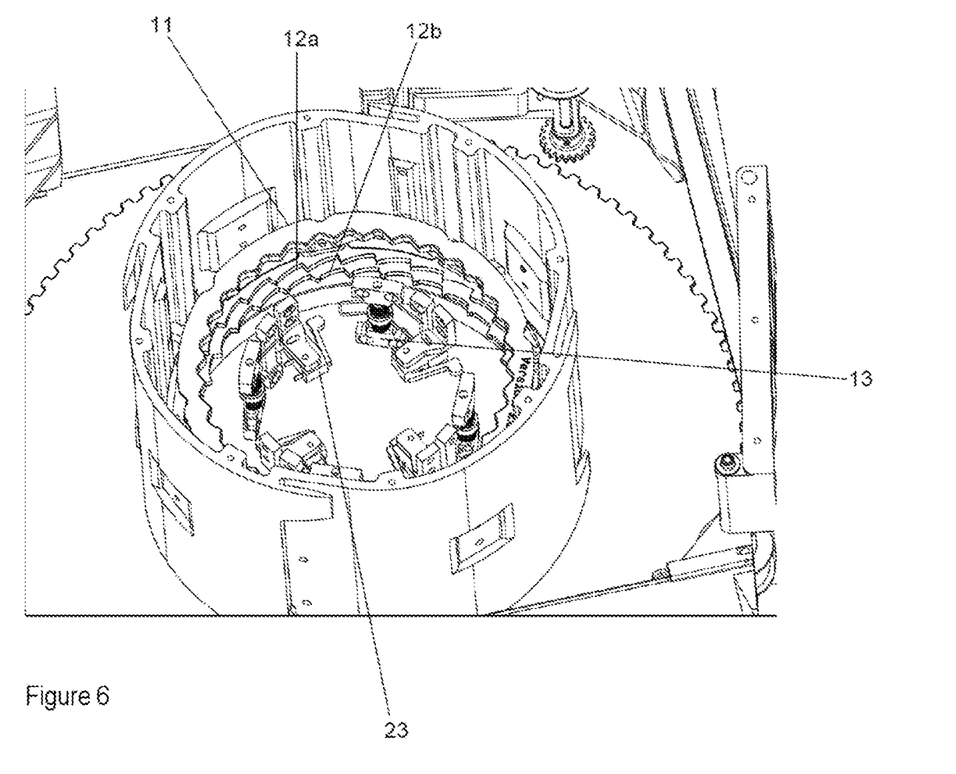
FIG. 6 is a detailed view of the brake elements.

FIGS. 5 and 6 show in detail the brake device 10 arranged in the winding core 32, wherein in the embodiments of FIGS. 5 and 6 the brake ring 11 has a total of two toothed profiles 12a and 12b. In this variant, the first toothed profiles 12a has a corresponding tooth flank geometry on which the brake levers can slide along in order to transmit the brake torque thereof. The second toothed profile 12b has in contrast corresponding stop locations which provide a corresponding surface for the brake levers 13 to jump over onto the next tooth flank or the next tooth. The sliding faces of the first toothed profile 12a are thereby protected and become worn less quickly.

Furthermore, in particular in FIG. 6, an end position switch 23 can be seen and is activated each time by the brake lever 13 shortly before the brake lever 13 jumps over onto the next tooth flank or the next tooth of the brake ring 11. It is thereby possible to detect each jump of a brake lever onto the next tooth so that, with knowledge of the number of teeth of the brake ring 11 and the number of the detected rollovers of the brake lever 13, conclusions can be drawn relating to the rotation position of the winding core.

To this end, it is conceivable for the end position switch 23 to be connected to a corresponding evaluation unit, for example, an electronic evaluation unit, which then calculates the corresponding position of the winding core.

Figure 7:
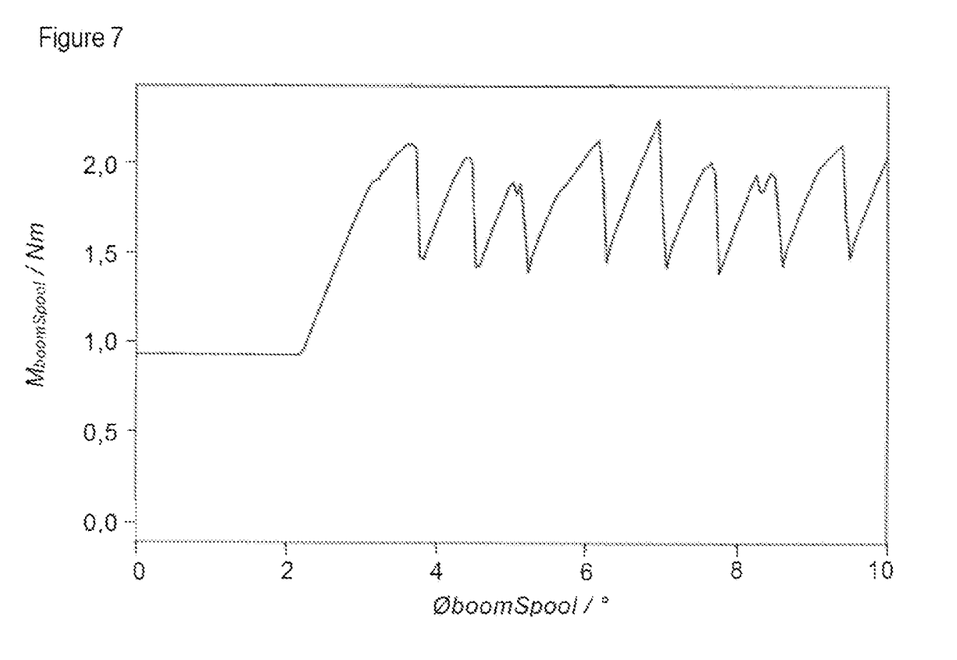
FIG. 7 is a graph of a brake torque path.

FIG. 7 shows the result of a test with a brake device, as known from FIGS. 4 to 6. In this instance, the brake torque produced is applied via the rotation angle of the mast coil. As can be seen, this characterization of the brake torque also has a corresponding saw-tooth-like path of the torque characteristic line, wherein, however, the lower value of the brake torque path never falls to zero, but instead moves in the range of approximately 70% of the maximum value. It is thereby possible to protect in particular the partially fragile elements of such a mast coil and further to ensure a corresponding unfolding in an operationally reliable manner.

LIST OF REFERENCE NUMERALS

1 Rotatable member
2 Hollow space of the member

3 Base structure
4 Rotation axle
10 Brake device
11 Brake ring
12 Toothed profile
12a First toothed profile
12b Second toothed profile
13 Brake lever
14 First end of the brake lever
15 Stop of the brake lever
16 Second end of the brake lever
17 Rotation axle of the brake lever
18 Rotary spring/force element
19 Tooth flank of the toothed profile
20 Restoring device
21 Carrier ring
22 Locking projection
23 End position switch
30 Device
31 Unfolding mechanism
32 Winding core
33 Elongate hollow member
34 Support element

The invention claimed is:

1. A brake device for producing a brake torque counter to a torque acting on a rotatably supported member or supportable member, comprising:
   at least one toothed brake ring mechanically actively connected to the rotatably supported or supportable member,
   a plurality of bending-resistant brake levers, each of said brake levers having a first lever end, at least one stop which engages in a tooth arrangement of the brake ring, and a second lever end opposite the first lever end, wherein each of the brake levers are rotatably supported by the second lever end,
   wherein each brake lever is connected to a force element for applying a brake force whereby, as a result of the brake force via the at least one stop of the respective brake lever which is in engagement with the tooth arrangement of the brake ring, a brake torque is produced on the brake ring tangentially counter to the active direction of the torque in order to apply a brake torque to the rotatably supported or supportable member,
   wherein the brake levers are arranged with respect to the toothed brake ring whereby, during a rollover of a brake lever of the brake levers, in which the at least one stop of the respective brake lever engages in a subsequent tooth flank of the tooth arrangement, all remaining brake levers with their respective stops remain in engagement with their respective tooth flank of the tooth arrangement.

2. The brake device according to claim 1, further comprising a rotary spring for each brake lever configured as a force element which engages on the respective brake lever in order to apply the brake force.

3. The brake device according to claim 1 wherein the toothed brake ring has an inner tooth arrangement and is arranged on an inner wall of a hollow space of the rotatably supported member or supportable member, wherein the brake levers are rotatably supported in such a manner that they are in engagement via their at least one stop with the inner tooth arrangement of the brake ring.

4. The brake device according to claim 1 further comprising a restoring device which has a carrier ring which is rotatably supported and which optionally can be brought into positive-locking engagement with the brake levers by locking projections, wherein the restoring device is constructed whereby, in the event of a rotation of the carrier ring counter to the active direction of the brake force, the brake levers are released by the locking projections from the tooth arrangement of the brake ring.

5. The brake device according to claim 1 wherein the tooth arrangement of the brake ring has an asymmetrical tooth geometry.

6. The brake device according to claim 1 further comprising at least one end position switch which cooperates with at least one brake lever of the brake levers so that the end position switch is activated by the brake levers when the rotatably supported member or supportable member is rotated.

7. The brake device according to claim 1 wherein the at least one brake ring has more than one toothed profile, wherein for each toothed profile the brake lever has a stop which engages in the respective toothed profile of the brake ring.

8. A device for unfolding a rolled-up elongate hollow member, comprising:
   at least one elongate hollow member which has two elongate shell member halves, and
   an unfolding mechanism which has a fixed base structure and a winding core which is rotatably supported on the base structure and on which the at least one elongate hollow member is rolled up and compressed in a first state and which, by rotating, moves and unfolds the elongate hollow member from the first state into an unrolled and unfolded second state so that an elongate hollow space is formed between the two shell member halves of the at least one elongate hollow member,
   wherein the at least one elongate hollow member has as a first end a hollow member root with which the elongate hollow member is secured to the rotatably supported winding core,
   wherein the winding core as a rotatably supported member has a brake device according to claim 1.

9. The device according to claim 8, wherein one, two, three or four elongate hollow members are secured to the winding core.

10. The device according to claim 8 wherein the unfolding mechanism has an unrolling drive to rotatably drive the winding core and to move the elongate hollow member from the first state into the second state, wherein the brake torque applied by the brake device to the winding core is adjustable such that the applicable brake torque of the brake device is greater than the torque produced by a self-unfolding force of the at least one elongate hollow member.

11. A method for unfolding at least one rolled-up elongate hollow member by an unfolding mechanism, wherein the at least one elongate hollow member in a first state is rolled up and compressed on a rotatably supported winding core of the unfolding mechanism and, by rotating the winding core is movable from the first state into an unrolled and unfolded second state, comprising:
   rotating the winding core of the unfolding mechanism to move the at least one rolled-up elongate hollow member from the first state into the second state,
   wherein, during rotation of the winding core, a plurality of bending-resistant brake levers, which each have on a first lever end at least one stop and which are rotatably supported on a second lever end opposite the first lever end, engage with their respective stops in at least one toothed brake ring which is mechanically actively connected to the winding core, wherein, during rotation of the winding core, a brake force is applied to each brake lever by a force element whereby, as a result of the brake force via the stop of the respective brake lever which is in engagement with a tooth arrangement of the brake ring, a brake torque is produced on the brake ring tangentially counter to the active direction of the torque to apply a brake torque to the rotatably supported or supportable member, during a rollover of a brake lever, in which the stop of the respective brake lever engages in a following tooth flank of the tooth arrangement, all remaining brake levers remain in engagement with their respective stops with their respective tooth flank of the tooth arrangement.

12. The method according to claim 11, wherein the brake force is applied by a rotary spring.

13. The method according to claim 11 wherein the brake levers are in engagement via the stops thereof with an inner tooth arrangement of the brake ring which is arranged on an inner wall of the winding core.

14. The method according to claim 11, wherein at least one end position switch is activated by one of the brake levers when the winding core is rotated.

* * * * *